United States Patent Office 3,498,822
Patented Mar. 3, 1970

3,498,822
CRIMP-SEALABLE COMPOSITE SHEET
Edward Barkis, 1231 Springmill Court, Atlanta, Ga. 30319; Albert D. Collevechio, 1701 Hettering Road, Afton, Wilmington, Del. 19803; and Thomas M. Quinn, E. Strasburg Road, R.D. 3, West Chester, Pa. 19380
No Drawing. Filed June 1, 1967, Ser. No. 642,691
Int. Cl. B05c 9/04; C09j 7/00
U.S. Cl. 117—68.5         7 Claims

ABSTRACT OF THE DISCLOSURE

The present invention provides a coating for oriented films which is operable with crimp-sealing machinery. It consists of (1) from 50 to 80 parts of an acrylic interpolymer, (2) from 50 to 20 parts of an adduct of rosin and an alpha-beta unsaturated dicarboxylic acid or partial esters of such adduct with a polyhydric alcohol, the total parts by weight of (1) and (2) equalling 100, and from 6 to 8 parts by weight of a carnauba wax-stearic acid mixture wherein the weight ratio of wax to acid is from 82:18 to 89:11.

---

This invention relates to a coating composition and a composite sheet coated with the composition. More particularly, it relates to an aqueous coating composition especially useful for coating thermoplastic case sheets.

This invention is an improvement on the invention disclosed in U.S. Patent 3,297,477 to Barkis and Quinn. This patent discloses a base sheet coated with a composition comprising from 50 to 80%, based on the weight of the composition of an interpolymer of from 50 to 60 weight percent of a $C_1$–$C_4$ alkyl methacrylate, from 50 to 40 weight percent of a $C_1$–$C_4$ alkyl acrylate, and from 1 to 5 weight percent of methacrylic, acrylic, or itaconic acid; from 50 to 20% based on the weight of the composition of an adduct of rosin and an alpha-beta unsaturated dicarboxylic acid or partial esters of the adduct; and from 1 to 5% of a paraffin or microcrystalline wax.

The coated films manufactured in accordance with this patent form excellent flat seals and are in commercial use for such applications as overwrap. However, in applications such as snack packaging where crimp seals are used to enable the package to be opened more easily, this film is not satisfactory, since it tends to stick in the crimping jaws and interrupts the functioning of the packing machinery, thus preventing continuous running of the film.

It is the object of this invention to provide a coating composition which, when applied to a thermoplastic film substrate, will allow the film to be continuously run on crimp sealing machines.

We have found that this object may be attained by substituting for the paraffin or microcrystalline wax emulsion described in the above patent a carnauba wax-stearic acid emulsion. The wax-acid weight ratio is extremely critical and must be within the range of 82:18 and 89:11.

The amount of wax-acid emulsion used is also highly critical, and should be from about six parts to about eight parts by weight of the emulsion, calculated as solids, per 100 parts of other solids. If less than about six parts is used, good crimp release is not obtained, and if more than eight parts is used, the heat seal range and strength is poor.

Thus the coating compositions of this invention consist of an aqueous medium containing from about 5 to 50 weight percent of a homogenous composition of (1) from 50 to 80 parts by weight of an interpolymer of from 45 to 60 parts by weight of a $C_1$–$C_4$ alkyl methacrylate, from 50 to 35 parts by weight of a $C_1$–$C_4$ alkyl acrylate, and from 1 to 5 parts by weight of an acid selected from the group consisting of methacrylic, acrylic, and itaconic acid; (2) from 50 to 20 parts by weight of an adduct of rosin and an alpha-beta unsaturated dicarboxylic acid or the partial esters of such adduct with a polyhydric alcohol, the total parts by weight of (1) and (2) equalling 100, and (3) from 6 to 8 parts by weight of a carnauba wax-stearic acid mixture in which the wax-acid ratio varies from 82:18 to 89:11. A particularly preferred composition contains 65 parts by weight of (1), 35 parts by weight of (2), and 7 parts by weight of (3).

The above-mentioned $C_1$–$C_4$ alkyl methacrylates and acrylates are the methyl, ethyl, propyl and butyl methacrylates and acrylates.

The alpha-beta unsaturated dicarboxylic acid includes for example, fumaric acid, maleic acid, maleic anhydride, citraconic acid, citraconic anhydride and mesaconic acid.

The partial esters of the adducts of rosin and an alpha-beta unsaturated dicarboxylic acid are formed with polyhydric alcohols which include, for example, ethylene glycol, propylene glycol, butyl glycol, diethylene glycol, triethylene glycol, tetraethylene glycol, glycerol, diglycerol ether, triglycerol ether, pentaerythritol sorbitol, and mannitol. Glycerol or mixtures containing active amounts of glycerol are preferred on the basis of availability and cost.

Rosin is ordinarily wood rosin or gum rosin, but may include equivalent materials, for example, abietic acid, crystalline abietic acid, isomerized rosin and polymerized rosin.

The composition also contains a small amount of morpholine as an aid to emulsification. The morpholine is evaporated when the coating composition is applied to the substrate and dried, so that it does not appear in the coating on the substrate. If other emulsifying aids such as the fatty partial esters of hexitans and polyoxyethylene derivatives thereof, which were found to be useful for emulsifying the coatings of U.S. Patent 3,297,477 are used, crimp release is not obtained.

The invention also includes a composite sheet comprising an oriented, non-fibrous, thermoplastic base sheet coated with the solids of the coating composition.

The base film of this invention is a monoaxially or biaxially oriented thermoplastic resin film including polypropylene, polyethylene, polyethylene terephthalate, polycarbonate and the like. The surface of the base sheet is advantageously pretreated to improve adhesion between the coating and the base film. Anchoring treatments of the film surface include application of thin coatings of well known anchoring resins, acid or oxidizing treatments and electrical discharge treatment.

The acrylic interpolymer of this invention is advantageously formed by an emulsion polymerization technique and the aqueous product thereof used as a component of the aqueous coating composition. In general, the polymerization is carried out in a well known manner in an aqueous system containing the monomers to be copolymerized, an initiator and activator, e.g., ammonium persulfate and metasodium bisulfite, and a dispersing agent, e.g., sodium lauryl sulfate. At completion of the polymerization reaction the dispersion may be stabilized by the addition of a small amount of organic salt. If a more dilute mixture is desired additional water may be added.

The adduct of rosin and an alpha-beta unsaturated dicarboxylic acid is readily formed by adding the acid to molten rosin or its equivalent and holding in the molten state for adduct formation. In general, an amount of acid ranging from 10 up to 50%, preferably about 25%, based on the weight of the rosin is used. The adduct formed is a hard, high melting point modified rosin which in combination with the acrylic resin of this invention forms a very desirable coating for the clear, oriented base film. In addition, the rosin adduct is readily dispersed in aqueous alkaline solutions which is then compatible with the aqueous dispersion of acrylic interpolymer.

The partial esterification of the rosin-acid adduct may be carried out in any suitable manner. For example, it may be effected by heating of polyhydric alcohol or mixture thereof with the adduct at a temperature of about 250° C. in an inert atmosphere. In general, an amount of polyhydric alcohol is used to produce a partial ester having an acid number no lower than about 40. These partial esters of the adducts are also dispersible in aqueous alkaline solutions to provide clear solutions.

Both the rosin-acid adduct and the partial ester thereof are dispersed in aqueous medium as follows:

An amount of water is heated to about 100° C. Ammonium hydroxide is added to the water in an amount to produce a pH of about 9 after the particular adduct or ester being used is added. While agitating the solution, an amount of finely-powdered adduct or partial ester thereof is added slowly and stirring is continued until a clear solution is formed. The solution is allowed to cool and, if it becomes cloudy, more ammonium hydroxide is added until it clears. The amount of adduct or partial ester added to the hot aqueous solution may vary from about 10 to about 50% by weight.

The wax-acid mixture is incorporated in the aqueous coating composition in the form of an emulsion. The wax-acid emulsion may be formed as follows: The mixture of carnauba wax and stearic acid is melted and held at about 100° C. Morpholine is then added, and the mixture is stirred until it appears to be homogenous. Boiling water is then added until a thick water-in-wax emulsion is formed. Addition of water is continued until inversion of the emulsion into a wax-in-water emulsion takes place. Addition of water is then continued until a clear emulsion is formed, after which it is cooled.

The preparation of the coating composition is as follows: Weighed quantities of the rosin-adduct solution and the acrylic interpolymer latex are mixed, and then the desired quantity of the wax-acid solution is added. Additional water is then added to bring the desired solids concentration to a range of from about 5 to about 50 weight percent, depending on the method of coating application to be used and the desired coating weight. The wax-acid is then added in the proportions specified above.

In the development of the invention emulsions of carnauba wax and stearic acid were made up as follows:

(A) 79 parts of carnauba, 21 parts of stearic acid and 10.5 parts of morpholine
(B) 83.3 parts of carnauba, 16.7 parts of stearic acid and 7.4 parts of morpholine
(C) 88.2 parts of carnauba, 11.8 parts of stearic acid and 6.7 parts of morpholine
(D) 91.8 parts of carnauba, 8.2 parts of stearic acid and 5.3 parts of morpholine all parts being by weight.

An aqueous dispersion of acrylic interpolymer was prepared by emulsion polymerization of a monomer mixture containing 54 parts by weight of ethyl methacrylate 43 parts by weight of butyl acrylate, and 3 parts by weight of methacrylic acid.

A rosin adduct was prepared by melting 100 parts by weight of gum rosin and mixing 25 parts of fumaric acid into the melt for adduct formation. The adduct was dispersed in an aqueous alkaline solution as previously described. The acrylic dispersion and the adduct dispersion were then mixed in amounts such that the mixture contained 65 parts by weight of acrylic and 35 parts by weight of adduct.

Coating compositions were then made up by adding to the acrylic-adduct mixture sufficient of the carnauba-acid emulsion to yield compositions containing 2, 5, 7, and 9 parts by weight of the carnauba wax-stearic acid mixture. These compositions were applied to biaxially oriented polypropylene films having a thickness of 0.6–0.7 mil. and corona discharge treated to a drop number higher than 1. The coating was applied to the film with a gravure coating head, and the film was air dried to produce a coated film having a coating of 1.5 grams per side per square meter. The films were then run on a crimping machine, with results as listed in the table.

| | At 2 parts | | | | |
|---|---|---|---|---|---|
| | A | B | C | D | E |
| Blocking test | Fails | Fails | Fails | OK | OK. |
| Crimp release | No | No | No | No | Fair. |
| Heat seal range | Excellent | Excellent | Excellent | Good | Good. |
| Heat seal strength | do | do | do | do | Do. |
| Haze, percent | 1.4 | 1.6 | 1.6 | 2.5 | 4.2. |

| | At 5 parts | | | | |
|---|---|---|---|---|---|
| Blocking test | Fails | OK | OK | OK | OK. |
| Crimp release | No | No | Fair – | Fair + | Excellent. |
| Heat seal range | Excellent | Excellent | Good | Good | Poor. |
| Heat seal strength | do | do | do | Fair | Do. |
| Haze, Percent | 1.4 | 2.0 | 1.7 | 4.4 | 8.2. |

| | At 7 parts | | | | |
|---|---|---|---|---|---|
| Blocking test | OK | OK | OK | OK | OK. |
| Crimp release | No | Good | Good | Good | Good. |
| Heat seal range | Excellent | Good to excellent | Fair | Fair | Poor. |
| Heat seal strength | do | Very good | do | Poor to fair | Do. |
| Haze, percent | 1.4 | 2 | 1.6 | 6.1 | 10+. |

| | At 9 parts | | | | |
|---|---|---|---|---|---|
| Blocking test | OK | OK | OK | OK | OK. |
| Crimp release | Good | Excellent | Excellent | Excellent | Excellent. |
| Heat seal range | Fair to poor | Poor | Poor | Poor | Poor. |
| Heat seal strength | Poor | do | do | do | Do. |
| Haze, percent | 1.9 | 2.7 | 2.1 | 7 | 10+. |

Poor crimp release means that of every 100 bags filled with 3 oz. of product, (in the tests potato chips were used), from 0 to 5 bags will come off the crimp sealer without assist, and from 95 to 100 bags will stick and will have to be hand-removed. Fair crimp release means that about 60 out of 100 will drop off, good release means that 90–100 will drop off, and excellent means that 100 out of 100 will drop off after repeated testing.

Heat sealing properties were tested through a range in excess of 100° F. at 1.5 lbs. pressure and a dwell time of ¾ second. An excellent sealing range would be from 100° F. to 120° F. (170° to 290° F. sealing temperature); good from 80–100° F. (200°–290° F.); fair from 60–70° F. (225–290° F.) and poor from 40–50° F. (245–290° F.).

Heat seal strength of 500+ gms./2 inches are considered excellent, 400–450 good, 300–350 fair, and 250 or less poor.

Films are considered to pass the blocking test if films readily separate after storage for 16 hours under a pressure of 0.67 p.s.i.

Haze is measured as the percentage of transmitted light which is scattered more than 2.5°.

As may be observed, emulsion A failed the blocking test at 2 and 5 parts, and crimp release test at levels of from 2 to 7 parts. At 9 parts the crimp release was good but the heat seal range was fair to poor and the seal strength was poor. Emulsion B failed the crimp test at 2 parts and 5 parts, and at 9 parts the heat seal strength and range were poor. Emulsion C failed the block and crimp release tests at 2 parts, and exhibited marginal properties at 5 parts. At 9 parts heat seal range and strength were poor. Emulsions D and E gave too much haze at all levels for commercial film, in which haze level should not exceed about 2%.

It will be observed, therefore, from the foregoing data that the stearic acid content of the carnauba-acid mixture should be less than 21% and greater than 8.2% preferably, as stated above, from 18% to 11%, and the carnauba-acid mixture should be present in the coating composition in an amount slightly greater than 5 parts by weight, but less than 9 preferably from 6 to 8 parts.

What is claimed is:

1. A composite sheet comprising an oriented thermoplastic base sheet and a coating on at least one side thereof comprising a composition of (1) from 50 to 80 parts by weight of an interpolymer of from 45 to 60 weight percent of a $C_1$–$C_4$ alkyl methacrylate, from 50 to 35 weight percent of a $C_1$–$C_4$ alkyl acrylate, and from 1 to 5 weight percent of methacrylic, acrylic, or itaconic acid; (2) from 50 to 20 parts by weight of a compound selected from the group consisting of an adduct of rosin and an alpha-beta unsaturated dicarboxylic acid and the partial esters of such adduct and a polyhydric alcohol, the total parts by weight of (1) and (2) equalling 100; and from 6 to 8 parts by weight of a mixture of carnauba wax and stearic acid wherein the weight ratio of wax to acid is from 82:18 to 89:11.

2. The composite sheet of claim 1 in which the alpha-beta unsaturated acid is fumaric acid.

3. The composite sheet of claim 1 in which the base sheet is biaxially oriented polypropylene film.

4. The composite sheet of claim 2 in which the base sheet is biaxially oriented polypropylene film.

5. The composite sheet of claim 1 in which the carnauba wax-stearic acid mixture is present in an amount of about 7 parts by weight.

6. The composite sheet of claim 5 in which the alpha-beta unsaturated acid is fumaric acid.

7. The composite sheet of claim 6 in which the base sheet is biaxially oriented polypropylene film.

References Cited

UNITED STATES PATENTS

| | | | |
|---|---|---|---|
| 3,297,477 | 1/1967 | Barkis et al. | 117—161 X |
| 3,100,760 | 8/1963 | Brown et al. | 260—28.5 |
| 2,845,398 | 7/1958 | Brown et al. | 260—28.5 |
| 1,901,094 | 3/1933 | Gabosch | 117—122 |
| 1,310,624 | 7/1919 | Kenworthy | 117—168 |

WILLIAM D. MARTIN, Primary Examiner

MATHEW R. P. PERRONE, Jr., Assistant Examiner

U.S. Cl. X.R.

117—47, 122, 138.8, 161; 260—23, 27, 28.5